United States Patent [19]

Keough et al.

[11] Patent Number: 5,104,446

[45] Date of Patent: Apr. 14, 1992

[54] AGGLOMERATION PROCESS

[75] Inventors: William J. Keough, Toronto; Donald L. Parker, Thornhill; Neil L. Smith, Oakville; Thomas N. Antonioni, Sudbury, all of Canada

[73] Assignee: Iron Tiger Investment Inc., Burlington, Canada

[21] Appl. No.: 585,841

[22] Filed: Sep. 20, 1990

[30] Foreign Application Priority Data

Sep. 29, 1989 [CA] Canada .................................... 615299

[51] Int. Cl.$^5$ ............................................ C22B 1/244
[52] U.S. Cl. ........................................ 75/755; 75/762; 75/770; 75/771
[58] Field of Search ................... 75/755, 762, 770, 771

[56] References Cited

U.S. PATENT DOCUMENTS

| | | |
|---|---|---|
| 2,750,274 | 6/1956 | Lellep ..................................... 75/755 |
| 3,174,846 | 3/1965 | Brisse et al. . |
| 3,262,771 | 7/1966 | Ban . |
| 3,770,416 | 11/1973 | Goksel . |
| 4,234,320 | 11/1980 | Vershuur ................................. 75/771 |
| 4,525,208 | 6/1985 | Yasukawa et al. . |
| 4,612,041 | 9/1986 | Matsuoka . |
| 4,758,268 | 7/1988 | Bishop et al. . |
| 4,831,943 | 5/1989 | Aune . |
| 4,872,906 | 10/1989 | Auth et al. .............................. 75/755 |

*Primary Examiner*—Melvyn J. Andrews
*Attorney, Agent, or Firm*—Rogers, Bereskin & Parr

[57] ABSTRACT

A process and apparatus are described for agglomerating metal-containing fine sized particles of metallurgical waste materials continuously by means of a combustible agglomerating agent. The process and apparatus may be adapted to dust and fine particles of different origins and having any particular particle size range and bulk specific gravity. The agglomerates are obtained by feeding the dust or fine sized particles and a combustible agglomerating agent to a continuous mixer, then to a heated rotatable kiln. The agglomerates are subsequently allowed to fall onto one or more conveyor belts, arranged in sequence. The agglomerates on the conveyor belts may be cooled, either by water or compressed air jets impinging upon them, or by cooling the belt surfaces on which the agglomerates are carried. The agglomerating agent may be a low melting point hydrocarbon such as wax, tar, pitch, or the hydrocarbon may be emulsified with water to form an emulsion and then mixed with the particles.

The agglomerates may also be extruded after mixing, by having conventional extruding means incorporated in the apparatus.

17 Claims, 2 Drawing Sheets

AGGLOMERATION PROCESS

This invention relates to treatment of waste products, in particular metallurgical waste products, having small particle size, for storage and/or recycling for further recovery.

Finely sized waste products or by-products are often encountered in industry. Such waste products may contain components which might usefully be returned to the production cycle, or may be utilized by other industry. Due to their small particle size, the waste products may be difficult to handle, producing dust and being hazardous to persons handling these products.

Industry concerned with the extraction of metals, or with the utilization and working of metals in their refined state, often produce waste products which contain metals in various stages of purity.

Electric smelting furnaces, converters, and similar pyrometallurgical installations have exit gases, or flue gases, which are passed through electrostatic precipitators to remove dust or other condensed particles carried by the gases. The dust, or fine particles containing various metals, such as zinc, arsenic, nickel and similar metals which have been vapourized in the furnace or in the extractive process step, are carried by the flue gas and subsequently collect on the surface of the electrostatic precipitator.

In refineries metal-containing melts in various oxidation states, dross, oxides, melts spilled or retained in ladles, and similar waste products usually contain value metals in amounts which may render them economically suitable for recycling to extractive process steps.

Slag may, in some instances, entrain metallic particles which can be liberated by grinding and separated by beneficiation processes.

Electrolytic processes, whether the process is directed to refining or electroplating, produce slimes which usually contain value metals.

Metal finishing plants, in which metals are hot or cold worked, usually have metal containing waste products.

In the chemical industry in some production processes, very fine copper or nickel or alloy particles are utilized as catalysts. Frequently, when these catalysts cease to be effective (often described as spent catalysts) the metallic particles are recycled to be refined.

Most of the commonly encountered metal-containing fine particles which might be considered as contenders for recycling in the metallurgical industry, result from one or other of the above processes. However, there may also be dust derived from other sources that may be considered economical to recycle by the person skilled in the art.

The above by-products or waste products have a common feature in that the particle size varies between a few microns to ½ inch or more in diameter. Such small particles are easily carried away by the hot gases emanating from a furnace or converter when recycled to extractive process steps and thus become airborne. Waste products have been known in the past to be added in combustible bags in a loose form, but the bags often burn before they hit the melt thereby allowing the dust to be blown out by the updraft or exit gases. It can be seen that feeding waste products to various furnaces or converters without pretreatment or agglomeration will lead to pollution and health hazards. The waste products to be recycled thus need to be agglomerated in a cost effective way.

In some industries waste products may be disposed of in a dump site where they are subjected to weathering, or crumbling, and hence producing dust which gets wind blown and pollutes the environment. In such instances, it is desirable to eliminate dust generated by dump sites and a method of relatively inexpensive agglomeration needs to be considered.

Economic considerations dictate in which stage of the metallurgical extractive process a waste product is to be added. A waste product containing predominantly highly purified metal such as a spent catalyst, can be more economically utilized in feeding it to a converter in the later stages of purification rather than being added at the early stages of metal extraction. Conversely, particles originating in the electrostatic precipitators contain silicates and various non-value metal oxides, hence a waste product such as Cottrell dust from the electrostatic precipitators is required to undergo early stages of extraction, and is advantageously fed to the smelters together with concentrate. It can be seen that for cost effective recycling, the waste products have to be agglomerated with due regard to their source, so that they may be entered at the economically most suitable extractive stage. Thus, there is a need for an apparatus and process which can not only produce agglomerates inexpensively but can be easily adapted to materials with different specific gravity and particle size and which, therefore, need different amounts of agglomerating agent.

In inexpensive agglomerative processes of waste products to be utilized in the metallurgical industry, a wholly combustible agglomerating agent is most advantageous. To be effective, the agglomerating agent is required to coat the surface of the bulk of individual particles. Hence the amount of such agent required per unit weight is inversely proportional to the particle size of the waste product. Advantageously, the agglomeration is carried out in an apparatus which has relatively simple components and has relatively low energy requirements.

In the past, the steel industry has been treating steel mill dust for further recycling to steelmaking and for recovering the non-ferrous metals contained therein. The conventional process, however, requires expensive pelletizing or briquetting, and in addition a separate high temperature reduction step for the vapourization of the non-ferrous metals present in the steel mill dust, before the iron-containing mill dust particles may be recycled to metal extraction.

STATEMENT OF INVENTION

An improved method has been found for the continuous agglomerating of fine particles originating in a metallurgical process, by the use of an apparatus which includes a first means for feeding the particles and a second means for feeding a combustible agglomerating agent, a mixing means enclosed in a housing, the housing being in communication with the first and second feeding means, a generally horizontal rotatable kiln, one end of the kiln being in communication with the mixing means enclosed in the housing, the other end of the kiln being open and the kiln having rotating means. Below the open end of the kiln and above a catchment area for agglomerates, is positioned at least one endless conveyor belt. The improved method carried out in the above described apparatus comprises the steps of:

a) feeding by means of the first feeding means, fine particles originating in a metallurgical process in controlled amounts to the mixing means;
b) feeding, by means of the second feeding means, a combustible agglomerating agent in amounts which are controlled and adjusted to the particle size range and bulk specific gravity of said fine particles, to the mixing means;
c) mixing the particles with the agglomerating agent by means of the mixing means;
d) passing the mixture so obtained to the rotating kiln, wherein the temperature is maintained above the softening point of the agglomerating agent, thereby forming agglomerates; and
e) passing the agglomerates through the opening in the kiln to the endless conveyor belt and transporting the agglomerates by means of the conveyor belt from the kiln to the agglomerate catchment area.

In one embodiment of the process the combustible agglomerating agent is mixed with the particles at a temperature above the softening point of the agent. In another embodiment of the process the combustible agglomerating agent is added in the form of an aqueous emulsion.

In a third embodiment extruding means are provided in the apparatus utilized by the process and the agglomerates are extruded through the opening of the mixing means, or optionally through the opening of the kiln.

One of the main objects of the process of the present invention is to provide agglomerates of waste products for storage or recycling to various stages of a metal extractive production process by utilization of an inexpensive hydrocarbon as agglomerating agent.

Yet another object of the process is to utilize an apparatus which is inexpensive to maintain and operate, and is adaptable to various feeding requirements of the metal production process.

Other objects and characteristics of this invention will become apparent from the disclosure and detailed description of the preferred embodiments of the invention with reference to the accompanying drawing.

DESCRIPTION OF PREFERRED EMBODIMENT

The preferred embodiment of the process of this invention may be adapted to any fine particles which have been previously exposed to high temperatures and are intended to be further utilized or to be subjected to further treatment steps. The process and apparatus for carrying out the process has been specifically designed to extract value metals from waste and by-products of metallurgical processes, but certain fine waste products of other industries may also be treated by this process, either for recovery of valuable materials contained therein or for storage.

There is neither a limitation to the particle size, nor to the range of particle sizes in applying the process. However, particles larger than about 2 cm (or 1 inch) in diameter should advantageously be crushed before they are agglomerated according to the present invention.

It is known that the finer the average size of the particles, the larger is the specific surface (the total surface area of particles contained in a unit volume) of the particles, and hence the amount of agent required for agglomerating fine particles will increase in inverse proportion to the particle size. Similarly, the weight percent of agglomerating agent required to agglomerate particles having a high bulk specific gravity (the weight of the particles contained in a unit volume) will be lower than the weight percent of agglomerating agent needed to agglomerate particles of low bulk specific gravity, given the particle size range is the same.

Thus, the amount of agglomerating agent mixed with the particles has to be adjusted to accord with the bulk specific gravity and the particle size range of the particular material to be agglomerated.

In the preferred embodiment of the invention means are provided for controlling the feeding of the amount of particles to be agglomerated, and similarly there are means provided for controlling and adjusting the amount of agglomerating agent addition to the amount and nature of the particles added, and maintaining agglomerating agent addition at this level. For the sake of convenience, the feeding of the fine particles to be agglomerated may also be adjustable.

Figure 1:
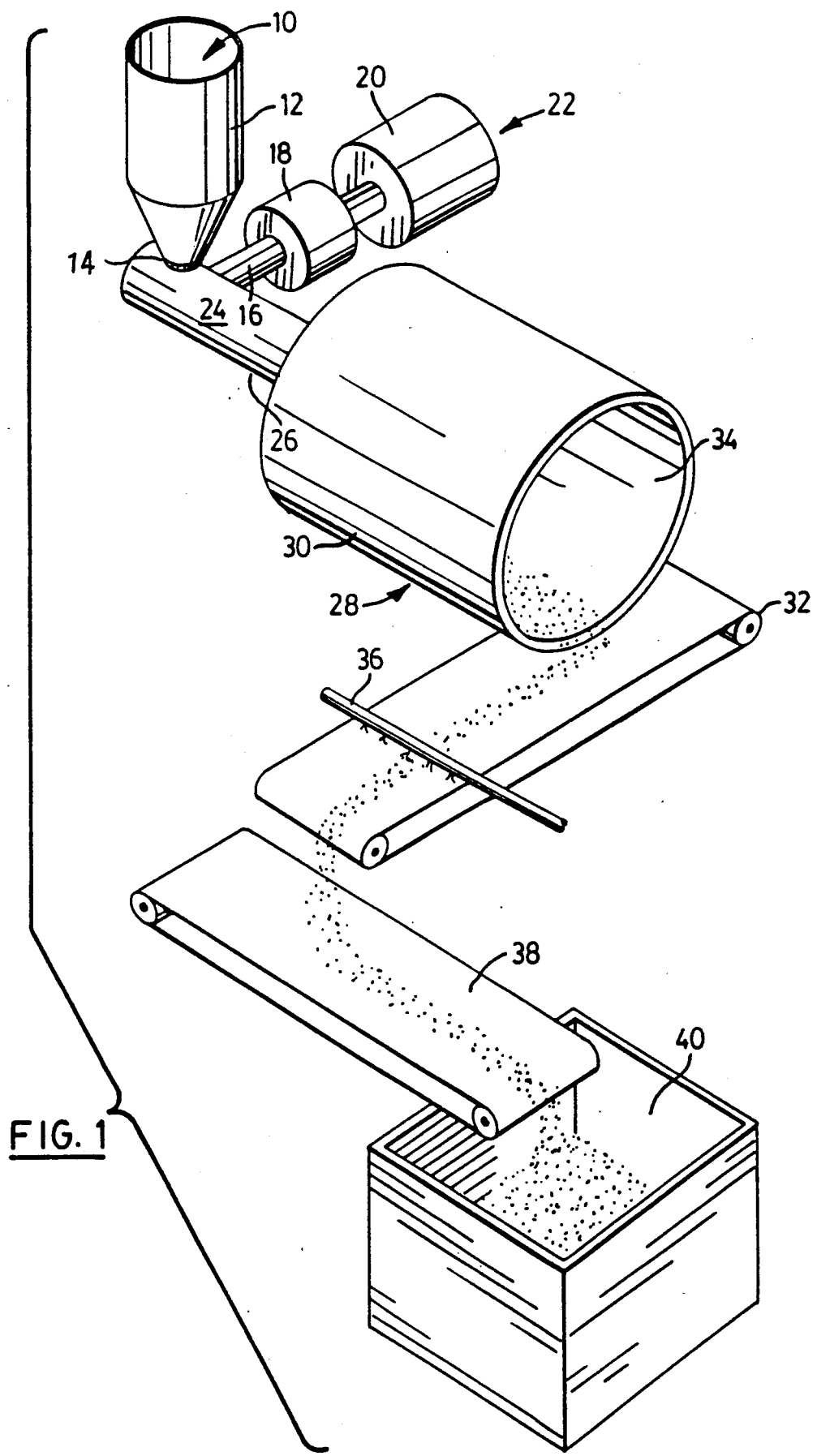
FIG. 1 shows schematically the apparatus utilized by the present invention.

Referring now to FIG. 1, fine particles (10) are added into a container such as a hopper or bin (12), hereinafter referred to as the hopper. The hopper (12) is connected to a housing (26) by way of a gate (14) which serves to control and adjust the flow of the fine particles to the mixer (24). It is desirable that the particles be sufficiently dry to provide uninterrupted flow. As an optional feature, means for heating and/or drying the particles before feeding them into the housing (26) are also incorporated in the hopper (12), but not shown. The means for feeding the fine particles to the mixing means is usually comprised of a hopper and a feed flow controlling means which may be a gate or a screw conveyor or a similar device which performs the same function.

Agglomerating agent (22) is added into container (20). In the preferred embodiment wax is used as the agglomerating agent and is heated by conventional heating means (not shown) connected to the container. The container may also be equipped with means (not shown) to circulate and blend when required, the softened agglomerating agent. Container (20) is communicating with the housing (26), through a pump unit (18) and a valve (16). The molten agglomerating agent is fed by the pump (18) through valve (16) in controlled amounts, adjusted to the amount of fine particles fed from the hopper (12), to the mixer to provide suitable agglomerates. Thus, the means for feeding the agglomerating agent to the mixing means usually comprises a pump and a valve, and optionally a container as well.

It is to be noted that if the amount of agglomerating agent is less than that required to coat the total surface of the particles, agglomeration will be incomplete and dust generation may not be eliminated. If, on the other hand, the agglomerating agent is used in excess of the amount required, the agglomerated product may not be able to retain its shape at normal temperatures, or may become fluid in the proximity of the high temperature installation prior to charging. In addition, unnecessary excess of agglomerating agent may increase the cost of the process substantially.

In another embodiment the hydrocarbonaceous agent is added as an aqueous emulsion. The emulsion is prepared in a conventional manner. In such instance, however, controlled heating and blending of the contents of container (20), are required. A person skilled in the art will be familiar with the adjustment required in the amount of hydrocarbons fed to the particles when an aqueous emulsion is used instead of undiluted hydrocarbon wax.

In the preferred embodiment shown in FIG. 1, the heated agglomerating agent is passed to the housing (26), controlled by a variable capacity pump (18) located between the container (20), and valve (16), and the particles are charged to the housing through gate (14). A screw conveyor (24) located within the housing (26), mixes the components and feeds the mixture to a rotatable kiln (30). While a screw conveyor is used in the preferred embodiment, other types of mixing means which perform the same function may be utilized. The screw conveyor and the housing are connected to the rotatable kiln (30) by conventional means.

A suitable agglomerating agent is hydrocarbon wax, which is solid at ambient temperature and has a relatively low softening point. Tar, pitch or heavy residual oil, or other combustible carbonaceous materials may also be used, as long as they have a softening point which can be reached without excessive heating. The agglomerating agent utilized in the preferred embodiment is hydrocarbon wax marketed by Esso under the trademark ESSO WAX 778.

| TYPICAL PHYSICAL PROPERTIES | |
| --- | --- |
| Melting Point, ASTM D127 | C. 63° |
|  | F. 145° |
| Colour, ASTM | 2.0 |
| Oil Content, Wt. % | 16 |
| Flash Point, COC, ASTM D92 | C. 250° |
|  | F. 480° |
| Viscosity ASTM D445 | |
| cST @ 100° C. | 7.2 |
| cST @ 80° C. | 10.8 |
| SUS @ 210° F. | 50.0 |
| SUS @ 180° F. | 62.0 |
| Cone Penetration mm/10, 25° C. | 27 |
| Specific Gravity | |
| 25° C. (solid) | .91 |
| 80° C. | .803 |
| 100° C. | .793 |

The above is given only by way of example of a hydrocarbon wax which is suitable as agglomerating agent.

The wax used as the agglomerating agent in the preferred embodiment may be replaced by other waxes or hydrocarbonaceous products of similar characteristics.

In the embodiment utilizing an aqueous emulsion referred to above, the container (20) designed to hold the agglomerating agent, may additionally be equipped with emulsifying means (not shown). Water, and optionally a conventional emulsifying agent, may be added at entry ports, separately or together with the agglomerating agent (22). The emulsifying means may be a suitable variable speed agitator or any commercially available equipment which facilitates the preparation of an aqueous emulsion of the combustible agglomerating agent.

Aqueous emulsions of wax or similar hydrocarbonaceous substances may be prepared with or without emulsifiers. A common method of producing an aqueous emulsion is blending water and a wax or a similar hydrocarbon in the presence of an emulsifier. The aqueous emulsion prepared in such manner may be stored for longer periods without separation.

The aqueous emulsion of the combustible agglomerating agent may be prepared in advance of its utilization and charged as an emulsion of the agglomerating agent to the container. The aqueous emulsion of the agglomerating agent may optionally be obtained commercially as ready-made emulsion and fed as such to the container.

An aqueous emulsion may also be prepared by blending with agitation at above-ambient temperature, water and wax, or a similar hydrocarbon, in the absence of an emulsifier. It is, however, advisable in this case, to utilize the resulting aqueous emulsion as soon as possible in order to avoid separation of the ingredients.

The agglomerating agent either as a melt or as an aqueous emulsion, is fed in controlled amounts which is adjusted to the weight of the fine particles, through a valve or a spray nozzle, or any similar means capable of providing a controlled flow, to a suitable mixing means such as for instance a screw conveyor.

Referring now further to FIG. 1, the inner face of kiln (30) may have baffles attached to it in order to assist in the mixing and blending of the particles with agglomerating agent. Devices which ensure continuous rotation of the kiln, as well as various means for heating (28) the kiln are known and are available commercially.

The main axis of the kiln (30) may be close to vertical or enclose any angle with the horizontal, but it has been found that horizontal or a small angle enclosed with the horizontal is the most suitable arrangement. Heating time and temperature are adjusted to ensure that the agglomerating agent wets and coats the particles without undue excess. A person skilled in the art will be able to judge the degree of wetting and the length of the heating period required. The temperature of the rotatable kiln in the preferred embodiment is above the softening point of the agglomerating hydrocarbon wax.

Figure 2:
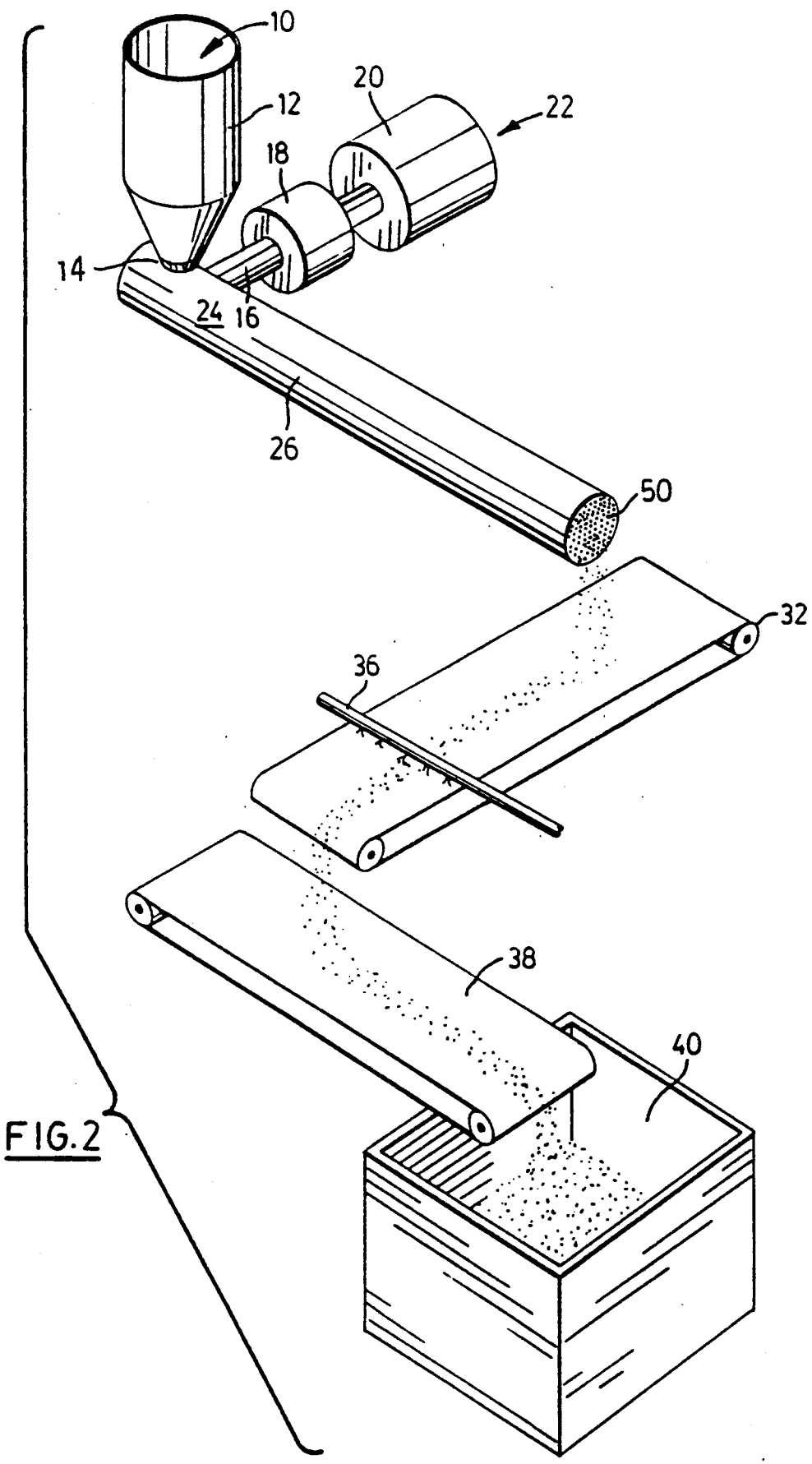
FIG. 2 is a modified form of the apparatus of FIG. 1 adapted to extrude the agglomerates.

In yet another embodiment the addition of the combustible agglomerating agent may take place at a temperature which is below the softening point of the agent, such as for instance, when the agglomerating agent is available in a granulated form. In such a case the particles and the agglomerating agent are mixed at ambient temperature, and the mixture is subsequently extruded at ambient temperature. In another instance the mixture may be heated in a furnace or kiln for a relatively short time before extruding pressures are applied. Application of heat to the mixture may not be necessary if the combustible agglomerating agent has a relatively low softening point or is added in the form of emulsion. Extruding means, (50) such as an extruding head, is conveniently located subsequent to the mixing means. This embodiment is schematically shown in FIG. 2. The extruding means, or head, may also be placed near the opening of the kiln from which the agglomerates leave the kiln.

The apparatus of FIG. 2 is a modification of FIG. 1, and like reference numerals represent like parts of the apparatus.

In the preferred embodiment shown in FIG. 1, the opening of the rotatable kiln is located opposite to the end communicating with the mixing device, and is open to the surrounding atmosphere. Any gases generated during mixing may leave at this open end. A fume and dust hood (not shown in FIG. 1) may be placed above the open end of the kiln to prevent contamination of the surrounding space. The agglomerated mixture (34) in the rotatable kiln exits the kiln at its open end and falls onto a first travelling conveyor belt (32). The conveyor belt (32) moves the agglomerates, which in the preferred embodiment are above the softening temperature of the agent and are, therefore, in a semi-solid state flowing onto this travelling belt in a discontinuous stream. As may be seen in FIG. 1, one end of this conveyor belt is placed below the open end, or opening, of the rotatable kiln, and the other end may conventiently be placed in the proximity of a second conveyor belt (38) in such a manner, that the partially cooled agglomerates carried by the first conveyor belt are allowed to fall onto the second travelling conveyor belt (38). The second conveyor belt is not an essential feature of the process but it is advantageous. Optionally, more than two conveyor belts may be used. Preferably, the agglomerates are cooled while on the travelling belts. The cooling may be achieved by means of jets (36) which deliver fluid, such as water or compressed air which impinge upon the agglomerates. In another embodiment the belts are equipped with some form of internal cooling device (not shown), which ensures that the contact area between the moving belt and the agglomerates is cooled.

The partially, or completely, cooled agglomerates are allowed to drop into a catchment area, which in the preferred embodiment is a storage bin.

The agglomerating process works in a continuous manner, that is the stages from feeding the particles to obtaining the agglomerates are performed continuously, not in separate process steps.

The working of the process will now be illustrated by the following examples.

EXAMPLE 1

A mixture of metallurgical dust from smelting operations of a non-ferrous metal production plant having particle size such that the dust mixture passes through 325 mesh Tyler sieve (100% −325 mesh), and bulk density of 120 lbs per cubic feet, was mixed with a long chain paraffinic hydrocarbon wax agglomerating agent. The metallurgical dust had the following composition:

| Element | % By Wt. |
|---|---|
| Copper | 12.4 |
| Nickel | 28.2 |
| Cobalt | 9.7 |
| Iron | 17.5 |
| Sulphur | 16.7 |
| Silicon | 16.4 | the balance being oxygen and other trace elements. The hydrocarbon wax had the following physical properties:

| Specific gravity @ 80° C. | 0.8 g/cm$^3$ |
|---|---|
| Flash point | 250° C. |
| Viscosity centistokes @ 80° C. | 10.8 |

The hydrocarbon wax was heated to 80°–85° C. prior to mixing. The charging and flow of the two components were adjusted to provide a continuous feed to the screw conveyor (24) shown in FIG. 1. The ratio of the mixture was 9±1:91 = hydrocarbon wax: metallurgical dust by weight.

The mixture was fed continuously by the screw conveyor to a rotating kiln equipped internally with baffles, which maintained the temperature of the mixture at 55° C. The rotational speed of the kiln was 18 revolutions per minute. Residence time of the mixture in the kiln was 4–5 minutes. Two continuous conveyor belts were incorporated in the apparatus in the arrangement shown in FIG. 1. The agglomerated and heated mixture fell in a stream onto the first travelling conveyor belt. Water jets placed above the first conveyor belt cooled the agglomerates. The second conveyor belt receiving agglomerates from the first conveyor belt was at ambient temperature in this case, but was also equipped with water cooling jets.

The agglomerates produced were collected in a bin dropping off the second conveyor belt.

The agglomerates produced ranged in size between 2 to 7 mm in diameter and were spherical or irregular spheroid shaped. The agglomerates could be transported with ease. No dusting was observed in handling the agglomerates.

EXAMPLE 2

An aqueous emulsion was produced from equal parts of water and Esso 778 wax by conventional emulsion preparative techniques. The calculated amount of wax was added in a container such as a container (20) shown in FIG. 1, which was equipped with a heater, temperature controller and with a high speed—high shear agitator as well. When the wax was heated to 80–90° C., an equal volume of 90° C. temperature water was added to the hot wax, with agitation. The rate of addition of the hot water was slow at first, but it was increased as the emulsification reduced the viscosity of the mixture.

The emulsion was subsequently allowed to cool to about 30° C., and then pumped from the container (20) to the screw conveyor (24) to be mixed with the requisite amount of dust. The valve (16) as shown in FIG. 1 was replaced by a spray-nozzle in this case, for the sake of convenience.

The mixture of wax emulsion to dust was adjusted to have a weight ratio of 10:90, thus providing an agglomerate in which the wax to dust ratio is 5:90.

The agglomeration was accomplished as described in Example 1.

Very good agglomerates having a hard skin and being handleable without any dusting, were obtained.

One of the advantages of the present process is that it accommodates changes in the nature of the waste particles. As discussed above, if the surface characteristics of the particles to be agglomerated change, the rate of feeding of the particles may be changed by adjusting the feeding rate through gate (14) without interruption to the agglomerating process. Similarly, the agglomerating agent feeding pump and valve may be adjusted as required, without interruption or without having to wait for the whole apparatus to reach ambient temperature. Thus the process of the present invention may easily be adapted to different types of waste particles, different particle sizes, and different end uses. These and other advantages will be obvious to persons skilled in the art.

Although the present invention has been described with reference to the preferred embodiment, it is to be understood that modifications and variations may be resorted to without departing from the spirit and scope of the invention, as those skilled in the art will readily understand. Such modification and variations are considered to be within the purview and scope of the invention and the appended claims.

We claim:

1. An improved method of continuously agglomerating fine sized particles originating in a metallurgical process by the use of apparatus which includes a first means for feeding said particles and a second means for feeding a combustible agglomerating agent, a housing enclosing mixing means, said housing being in communication with said first means for feeding particles and said second means for feeding agglomerating agent, and a generally horizontal rotatable kiln having two ends, one end of said kiln being in communication with said mixing means enclosed in said housing, said kiln being open at the other end, and said kiln having kiln rotating means, at least one endless travelling conveyor belt maintained in a position below the open end of said rotatable kiln and said conveyor belt being above a catchment area for agglomerates, and said belt having means for generating travelling movements, said improved method comprising the steps of:
 a) feeding by said first feeding means fine particles originating in a metallurgical process, in controlled amounts to said mixing means;
 b) feeding by said second feeding means a combustible agglomerating agent, in amounts which are controlled and adjustable to the particle size range and bulk specific gravity of said fine particles, to said mixing means;
 c) mixing said particles with said agglomerating agent in said mixing means;
 d) passing said mixture yielded by said mixing means to the rotatable kiln, wherein the temperature is maintained above the softening point of said agglomerating agent, thereby obtaining agglomerates;
 e) passing the agglomerates so obtained through said opening in said kiln to said travelling conveyor belt and transporting said agglomerates by means of said conveyor belt from the kiln to said agglomerate catchment area.

2. A method as claimed in claim 1, wherein the temperature of said agglomerating agent is maintained above the softening point of said agglomerating agent during feeding in step b).

3. A method as claimed in claim 1, wherein said combustible agglomerating agent is added as aqueous emulsion by said second feeding means.

4. A method as claimed in claim 3, wherein said aqueous emulsion comprising water and agglomerating agent is prepared in said second feeding means, said second feeding means further comprising heating means and emulsifying means, and said aqueous emulsion is prepared by heating said agglomerating agent and said water above the softening point of said agglomerating agent, and emulsifying by dispersing one in the other.

5. A method as claimed in claim 3 or 4, wherein the water comprising said aqueous emulsion of said agglomerating agent, is evaporated at least partially in said rotating kiln.

6. A method as recited in claim 1, wherein said mixture in said rotatable kiln is heated by a kiln heating means additionally comprised by said kiln.

7. An improved method of continuously agglomerating fine particles originating in a metallurgical process by the use of an apparatus which includes a first means for feeding said particles and a second means of feeding a combustible agglomerating agent, a housing enclosing mixing means, said housing being in communication with said first means for feeding particles and said second means for feeding agglomerating agent, an extruding means being connected to said mixing means at the end opposite to the end being in communication with said first and second feeding means, at least one endless travelling conveyor belt maintained in a position below said extruding means and said conveyor belt being above a catchment area for agglomerates, and said belt having means for generating travelling movements, said improved method comprising the steps of:
 a) feeding by said first feeding means fine particles originating in a metallurgical process in controlled amounts to said mixing means;
 b) feeding by said second feeding means a combustible agglomerating agent in amounts, which are controlled and adjustable to the particle size range and bulk specific gravity of said fine particles, to said mixing means;
 c) mixing said particles with said agglomerating agent in said mixing means;
 d) passing said mixture yielded by said mixing means to said extruding means, thereby obtaining extruded agglomerates;
 e) passing the extruded agglomerates so obtained to said travelling conveyor belt and transporting said agglomerates by means of said conveyor belt from the extruding means to said agglomerate catchment area.

8. A method as claimed in claim 6 or 7, wherein said particles are heated in said first feeding means by means for heating said fine particles, additionally comprises by said first feeding means.

9. A method as claimed in claim 2, 4 or 7, wherein said agglomerates have attained a temperature above the ambient by means of at least one of the steps consisting of the group: heating said fine particles, heating said agglomerating agent, and heating the mixture of said fine particles and said agglomerating agent, and said agglomerates are thereafter cooled during transporting by said conveyor belt, by cooling means additionally comprised in said conveyor belt.

10. A method as claimed in claim 9, wherein said agglomerates are cooled by means of a fluid impinging on said agglomerates, said fluid being selected from the group consisting of water and compressed air.

11. A method as claimed in claim 9, wherein said agglomerates are cooled during transporting by said conveyor belt, and said conveyor belt is additionally comprising means for cooling the contact surface between the conveyor belt supporting said agglomerates, and said agglomerates.

12. A method as claimed in claim 1 or 7, wherein said agglomerates are transported by a plurality of endless conveyor belts and the second belt and each of the subsequent belts, is being placed such that the agglomerates transported by the preceding belt are allowed to fall upon said belt.

13. A method as claimed in claim 1, 2 or 7, wherein said second feeding means further comprises heating means and circulating means and said method further comprises maintaining the temperature of said agglomerating agent above the softening point of said agglomerating agent.

14. A method as claimed in claim 1 or 7, wherein said agglomerating agent and said particles are mixed by means of a screw conveyor.

15. A method as claimed in claim 7, wherein said mixture of said particles and said agglomerating agent is passed through a rotatable kiln before being extruded, said kiln being placed between said mixing means and said extruding means.

16. A method as recited in claim 1 or 15, wherein the passing of said mixture in said rotatable kiln is assisted by baffles affixed to the inner face of said rotatable kiln.

17. A method as claimed in claim 1, 3 or 7, wherein a first agglomerated end product obtained is broken up to particles of sizes larger than the average initial particle size, the obtained broken up particles are re-fed through said first feeding means, then are mixed with a second portion of said agglomerating agent fed through said second feeding means in said mixing means, to yield a second mixture, subsequently said second mixture is passed through said kiln, thereby obtaining second agglomerates, the second agglomerates so obtained are being passed to at least one conveyor belt, and subsequently to said agglomerate catchment area.

* * * * *